Sept. 22, 1959  E. M. MAXEY  2,905,581
METHOD OF PREPARING SHIRRED HEAT-SEALED ELASTIC VINYL PRODUCTS
Filed Feb. 20, 1956

United States Patent Office 2,905,581
Patented Sept. 22, 1959

2,905,581

METHOD OF PREPARING SHIRRED HEAT-SEALED ELASTIC VINYL PRODUCTS

Edwin M. Maxey, Stow, Ohio, assignor to The B. F. Goodrich Company, New York, N.Y., a corporation of New York Application February 20, 1956, Serial No. 566,493

3 Claims. (Cl. 154—124)

This invention relates to heat-sealed elastic vinyl products and particularly to products made from flexible film of plasticized polyvinyl chloride, of which portions are made elastic by heat-sealing an elastic strip to the vinyl material.

It has been known for a great many years that products made from sheet rubber can be made to be easily extensible and to fit snugly in such locations as waist bands or openings for arms or legs of garments by adhering a stretched strip of rubber to the rubber sheet so that contraction of the strip puckers or shirrs the rubber sheet.

Sheet rubber has been largely replaced by flexible vinyl film material such as flexible plasticized polyvinyl chloride because of its greater economy and convenience, but attempts to provide elastic regions in such vinyl articles by adhesion of a stretched strip of the same material have failed because of the thermoplastic nature of the material, and it has accordingly been necessary to employ elastic tape made of textile material containing rubber thread which is stitched to the vinyl film and which is difficult to keep clean and which also tends to tear the vinyl material through the stitchings.

I have discovered that flexible vinyl film can be made elastic by heat-sealing a particular kind of synthetic rubber to it. The synthetic rubber which is used for this purpose is a so-called nitrile rubber, typically a copolymer of butadiene with acrylonitrile. The nitrile rubber is prepared in a conventional way as a thin strip and is vulcanized to enhance its elasticity and resistance to heat. It is preferably stretched and its then heat-sealed directly to the flexible vinyl film, to which it is found to adhere tenaciously. On contraction of the nitrile rubber strip the vinyl sheet is gathered or shirred to an extent determined by the degree of stretch of the strip.

The invention is illustrated in the accompanying drawing in which

Figure 1:
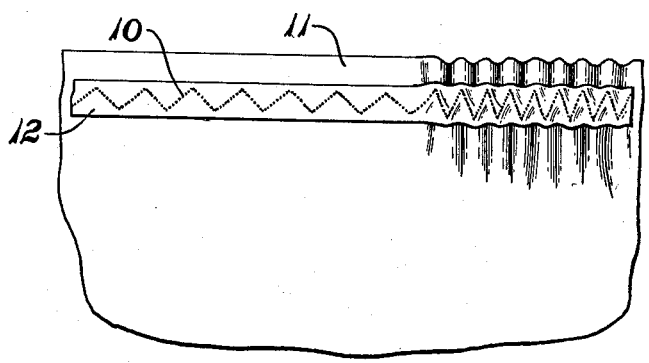
Figure 2:
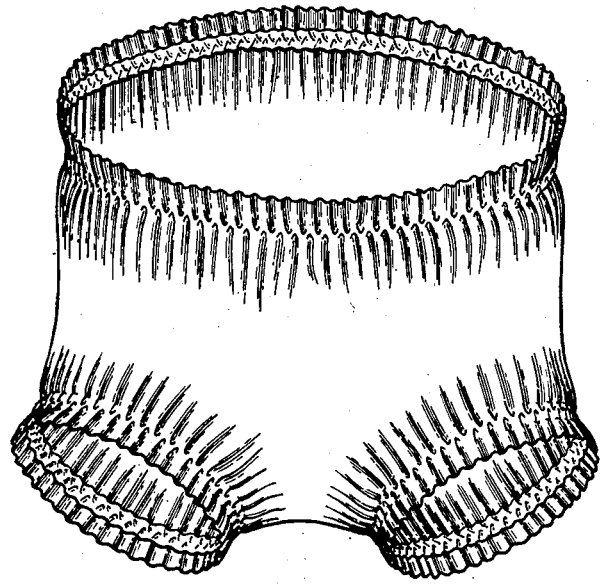

Fig. 1 is a fragmentary view of one margin of the product of this invention, and Fig. 2 is a view in reduced scale of a typical garment made in accordance with the invention, namely, a waterproof panty.

In the practice of the invention, the desired product is made up from flexible vinyl film by any of the usual procedures, such as calendering to a uniform sheet, cutting to shape, seaming with adhesive cement or by application of heat; or by some alternative such as application of the mixture of vinyl polymer and plasticizer with or without volatile solvent on a suitable supporting surface, which may be a form, a casting drum or even a textile material which becomes a part of the final product, followed by heating and cooling to fuse the material and confer its maximum strength to it.

The vinyl composition which is used for the vinyl portion of the product may be any conventional flexible vinyl composition, such as polyvinyl chloride, polyvinylidene chloride or any of the similar vinyl polymers capable of plasticization to a flexible extensible condition, including particularly copolymers of a predominant proportion of vinyl chloride with minor proportions of vinyl acetate, vinylidene chloride or other copolymerizable materials. To the polymer should be added an appropriate proportion of a suitable plasticizer, such as dioctyl phthalate, didecyl phthalate, didecyl adipate, tricresyl phosphate and the like alone or in admixture or together with resin-type plasticizers, such as viscous liquid or soft resinous polyesters, of which glycol adipate is typical. Extenders, processing aids, stabilizers, pigments, colors, etc. may be used as desired.

The elastic strip should be fabricated from a so-called nitrile rubber, meaning a copolymer of butadiene or one of its homologues or analogues, such as isoprene, monochloro butadiene, dimethyl butadiene and the like together with acrylonitrile or one of its homologues or analogues, such as methacrylonitrile, ethacrylonitrile, monochloro acrylonitrile and the like. The diene constituent should be present in a predominant proportion and the nitrile constituent should be present in sufficient proportion to confer its characteristic properties, preferably from about 15 to 45% of the total weight of the polymer. Other copolymerizable constituents may also be present in the copolymer, such as styrene, vinyl naphthalene, methyl methacrylate, vinylidene chloride and the like, in which case a tripolymer or multipolymer is formed. The nitrile rubber is used in a vulcanized form and is consequently mixed with such additives as are appropriate for that purpose, including sulfur or other vulcanizing agent, zinc oxide together with stearic acid and mercaptobenzothiazole or other combinations of vulcanization accelerators or activators, along with such antioxidants, procesing aids, extenders, reinforcing pigments, etc. as may be desired. The nitrile rubber containing the desired added materials is preferably shaped by extrusion or by calendering and slitting and is vulcanized by application of heat or otherwise to prepare it for use in the practice of this invention, in which it is desired that it be in the form of thin vulcanized strips. In case the elastic portion of the final product is intended to be endless, as in the case of waist bands, arm and leg openings and the like, the nitrile rubber may be formed into a tube by extrusion or otherwise, and after vulcanization the tube may be cut into bands of suitable dimension.

Inasmuch as the vinyl sheet necessarily requires the presence of plasticizer to make it flexible and extensible, care should be taken that the particular plasticizer or plasticizers and the proportions thereof should be such as to avoid undesirable effects resulting from plasticizer migration to or from the nitrile rubber. It is common to use the same types of plasticizer materials as are used for plasticizing polyvinyl chloride to facilitate the processing of nitrile rubbers and to confer greater elasticity on the vulcanized nitrile rubber. Consequently, the plasticizers used in the vinyl sheet and also such plasticizers as may be present in the nitrile rubber strip should preferably either be non-migratory in character or should be present in such proportions that there will be no tendency for plasticizer migration from either material to the other, or should be present at least in such proportions that only a harmless degree of migration will occur. Consequently, it is preferred that migratory plasticizers be present in about the same proportion of the combination of polymer and total plasticizer in both the vinyl sheet and in the nitrile rubber.

When the materials have been prepared in proper form they are assembled as follows: The proportion of the vinyl sheet material which is to be made elastic is placed in a heat-sealing device, such as an electronic sealer, which supplies heat energy in the area to be sealed. The sealer should preferably seal along a zigzag or undulating line. The nitrile rubber strip or band is stretched to the desired extent, usually from 25% to 100% of its relaxed length. The two layers are assembled together and then are heat-sealed together by the application of pressure together with heat energy as already mentioned. The exact degree of heat will depend on the composition and dimensions of the materials, but is comparable to that used for heat-sealing of two vinyl surfaces. When the heat-sealing operation is completed, the two materials will have been joined tenaciously together at the interface between the flexible vinyl sheet 11 and the nitrile rubber strip 12, along a zigzag or undulating line 10 as indicated on the left side of Fig. 1. When the tension of the nitrile rubber strip 12 is released the strip contracts and puckers or shirrs the vinyl sheet material in the manner illustrated on the right margin of Fig. 1.

In the manufacture of a complete garment, such as the waterproof panty illustrated in Fig. 2, the vinyl sheet material is cut to the desired shape and edge seams are formed in the usual way, as by heat-sealing. The waist band and the arm and leg openings are then made elastic by heat-sealing of strips or bands of stretched nitrile rubber around the openings in the manner described above. If strips are used, they can be joined by interposition of a small patch or flap of the vinyl sheet material followed by heat-sealing of the flap between the overlapping surfaces of the strip. If endless bands are used, the necessity for making a joint is avoided.

This invention is not limited to manufacture of any particular kind of article, but can be used for any product made from or containing flexible vinyl sheet or film which is to be made elastic in a particular region. Such articles include various garments, protective covers, lamp shades, ornaments, to mention only a few.

I claim:

1. The method which comprises placing a thin layer of flexible plasticized vinyl chloride polymer material in direct face to face contact with a thin layer of elastic vulcanized nitrile rubber material and heat-sealing the two layers by application of heat and pressure over a portion only of the contacting faces.

2. The method as defined in claim 1 in which the materials of the two layers contain approximately equal proportions of migratory plasticizers.

3. The method of preparing a shirred elastic flexible article which comprises placing a thin layer of flexible plasticized vinyl chloride polymer material in direct face to face contact with a stretched thin layer of elastic vulcanized nitrile rubber material, heat-sealing the two layers by application of heat and pressure over a portion only of the contacting faces, and relaxing the stretched layer to cause the other layer to be gathered in the direction of elasticity.

References Cited in the file of this patent

UNITED STATES PATENTS

| | | |
|---|---|---|
| 1,544,312 | Gray | June 30, 1925 |
| 2,278,777 | Garvey et al. | Apr. 7, 1942 |
| 2,570,829 | Maxey et al. | Oct. 9, 1951 |
| 2,669,535 | Orr | Feb. 16, 1954 |